March 1, 1938. H. S. JOHNS 2,109,861
FEEDING APPARATUS FOR FLEXIBLE TUBULAR BELT CONVEYERS
Filed April 3, 1937 2 Sheets-Sheet 1
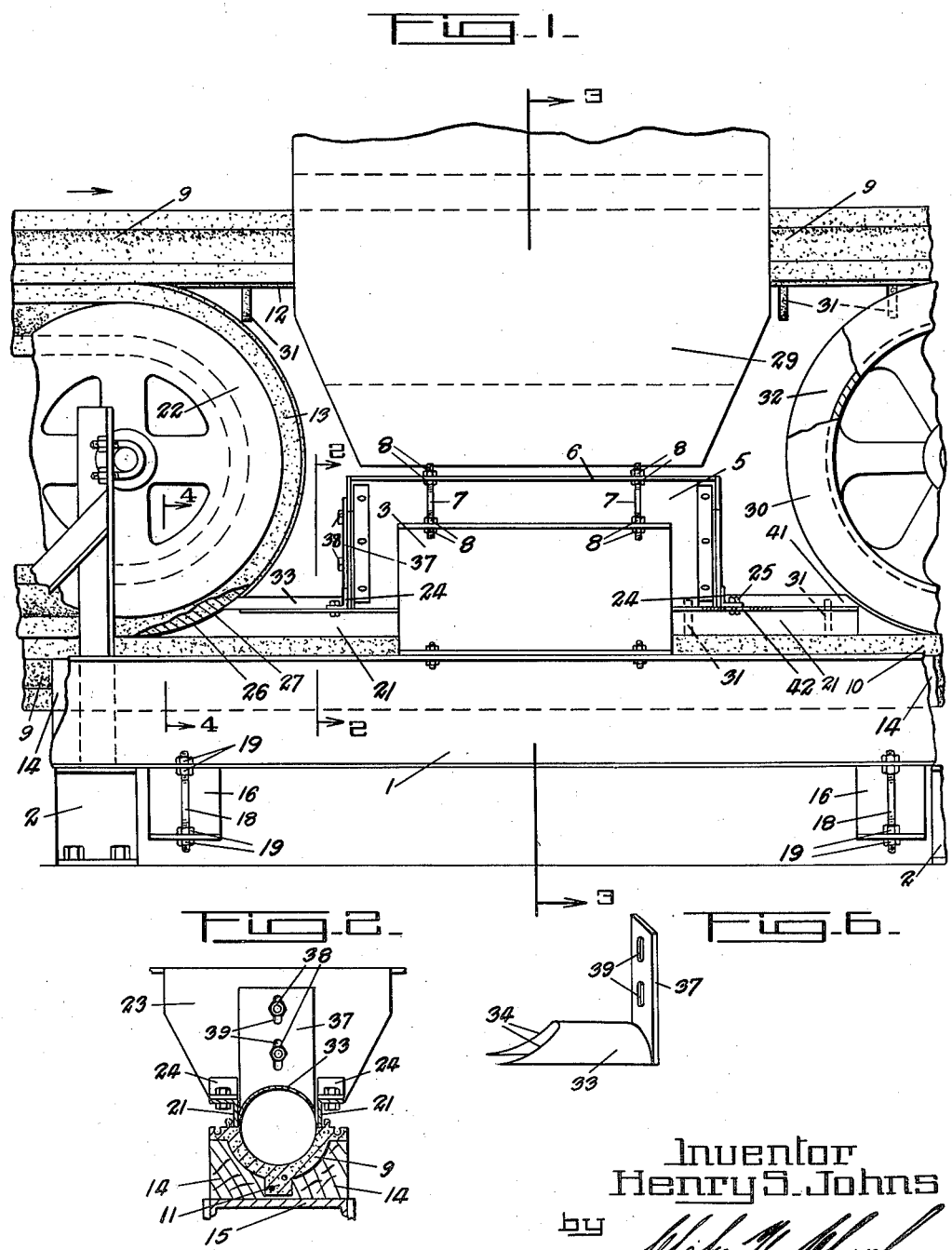
Inventor
Henry S. Johns
by
Atty March 1, 1938. H. S. JOHNS 2,109,861
FEEDING APPARATUS FOR FLEXIBLE TUBULAR BELT CONVEYERS
Filed April 3, 1937 2 Sheets-Sheet 2
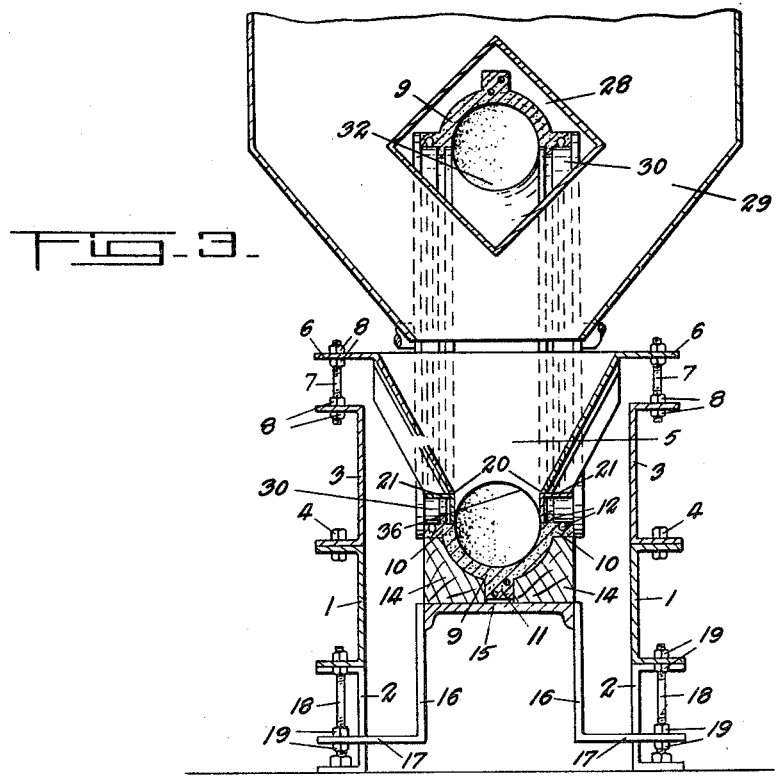
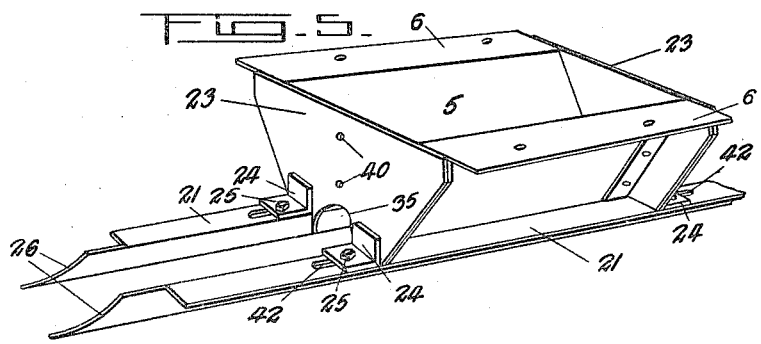
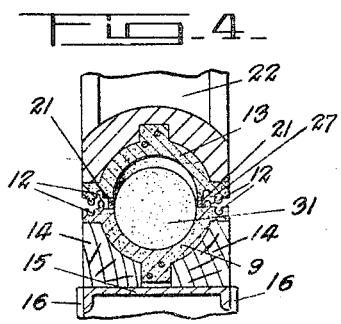
Inventor
Henry S. Johns Patented Mar. 1, 1938

2,109,861

UNITED STATES PATENT OFFICE 2,109,861

FEEDING APPARATUS FOR FLEXIBLE TUBULAR BELT CONVEYERS

Henry Stinson Johns, North Grimsby Township, Ontario, Canada, assignor to Bancroft Holdings Limited, Hamilton, Ontario, Canada, a joint-stock company of Ontario Application April 3, 1937, Serial No. 134,755

12 Claims. (Cl. 198—165)

My invention relates to improvements in feeding apparatus for flexible tubular belt conveyers of the type disclosed in my United States Patent No. 2,013,242, Conveying mechanisms, issued September 3rd, 1935, and the object of my present invention is to provide a mechanism for feeding material into one of the trough shaped belts and wherein such mechanism can be adjusted in its relationship to the belt at a number of points so that the greatest feeding efficiency and smoothness of operation is attained.

Another and particular object of my invention is to provide a pair of belt supporting members upon which the belt slides and also to adjustably mount such members so that the position of the belt can be adjusted to the material feeding portion of the apparatus.

A further object of my invention is to furnish a pair of horizontal guide members which are in alignment with the sides of the trough in the belt to guide the material thereinto and also to retain the material in the trough of the belt until the second or cover belt passes into contact with the material carrying belt to form the moving tube, such guide members being also adjustable in their relationship to both the material receiving belt and the cover belt.

With the foregoing and other objects in view, my invention consists of a feeding apparatus constructed and arranged all as hereinafter more particularly described and illustrated in the accompanying drawings in which:

Figure 1 is a side elevational view of my apparatus.

Figure 2 is a vertical cross-sectional view through a portion of the apparatus, being taken through the line 2—2, Figure 1.

Figure 3 is a vertical cross-sectional view through the complete apparatus, being taken through the line 3—3, Figure 1.

Figure 4 is a vertical cross-sectional view through the material carrying belt and the cover belt just before they come together, being taken through the line 4—4, Figure 1.

Figure 5 is a perspective view of the feed hopper portion of the apparatus together with a pair of belt contacting guide members which are adjustably attached thereto, and Figure 6 is a perspective view of a member which covers the portion of the belt carrying material between the feed hopper and the cover belt.

Like characters of reference indicate corresponding parts in the different views of the drawings.

It will be understood that the type of conveyer as disclosed in my United States Patent No. 2,013,242, consists of a pair of rubber trough shaped belts which extend around pulleys and are directed together to form a moving tube, and that the material to be conveyed is fed into the trough in the lower or carrier belt, and that the upper or cover belt is then carried into position on top of the material containing lower belt to form the moving tube. The material to be conveyed is contained within a hopper formed with an open bottom, underneath which the material receiving belt passes, so that the material drops from the hopper into the trough in the belt travelling therebeneath.

As illustrated in the accompanying drawings, my feeding apparatus is mounted upon a pair of horizontally positioned parallel channel members 1 which are in turn supported by feet 2 which rest upon the floor or any other suitable supporting structure. The channel members 1 support a pair of channel members 3 which are shorter in length than the channels 1. The abutting flanges of the channels 1 and 3 are suitably secured together by bolts 4. An open bottomed hopper 5 of V-shaped cross-section is positioned between the channels 3 in parallel relation thereto and is formed with a pair of horizontally extending side lips 6 which are positioned above the upper flanges of the channels 3. A pair of stud bolts 7 extend between the upper flange of each channel 3 and the lip 6 positioned thereabove. Such bolts freely pass through orifices in the flanges and lips and are provided with four nuts 8 which engage the upper and lower faces of the channels and lips so that by adjusting the position of the nuts 8 upon the stud bolts 7 the hopper 5 can be adjusted in height or angularity.

The material receiving or carrier belt 9 extends between the pairs of channels 1 and 3 underneath the open bottom of the hopper 5. The belt is formed with two side ribs 10 and a central lower rib 11, and also with two pairs of tongues and grooves 12 which interengage corresponding tongues and grooves in a similarly constructed cover belt 13. The belt 9 is supported upon a pair of slides 14 which extend from end to end of my apparatus and are formed of wax impregnated wood or any other suitable material. The bottoms of the ribs 10 rest upon the top portions of the slides 14 and the inner sides of the slides engage the sides of the lower belt rib 11. The inclined faces of the slides are correspondingly curved to the rounded faces of the outside of the belt. The slides rest upon and are attached to a horizontal channel member 15 which also extends from end to end of my apparatus, and is in turn supported by four pieces of angle iron 16 which are welded or otherwise secured to the flanges of the channel member 15. The horizontal portions 17 of the angle irons 16 protrude outwardly underneath the lower flanges of the channels 1 and are hung therefrom by stud bolts 18 which freely pass through orifices in the bottom flanges of the channels 1 and in the outer ends of the portions 17 of the angle irons. The stud bolts 18 each carry four nuts 19 which engage the channel flanges and angle irons, so that by adjusting the position of the nuts upon the stud bolts the angle irons 16 and slides 14 can be adjusted as to height and angularity.

A pair of guide members are interposed between the lower edges 20 of the sloping sides of the hopper 5 and the top faces of the carrier belt 9. These guide members consist of a pair of angle irons 21 which are of greater length than the hopper and extend from one end of the hopper to engage the cover belt 13 as it passes around the pulley 22 into contact with the lower belt. The angle irons 21 are each so positioned that one flange is horizontal and the other flange vertical. The horizontal flanges engage the lower edges 20 of the sides of the hopper and the vertical flanges extend downwardly from the edges of the hopper into close proximity with the top of the belt 9. The bottom opening of the hopper and guide angle irons 21 are so dimensioned and arranged that the distance between the vertical flanges of the angle irons is substantially the same as the width of the trough of the belt, so that material passing from the hopper is directed into the trough and does not contact the top faces of the belt.

The ends 23 of the hopper each carry a pair of brackets 24 which engage the top faces of the angle irons 21 and the angle irons are secured to the brackets by bolts 25 which pass through longitudinally extending slots 42 in the horizontal flanges of the angle irons and orifices in the brackets. By this arrangement, the loosening of the bolts 25 permits the angle irons to be slid forwardly or rearwardly as occasion demands.

In the forward ends of the angle irons the horizontal flanges are cut away and the ends 26 of the vertical flanges are rounded with the same curvature as the periphery of the cover belt 13 passing around the pulley 22 so that such forward rounded ends can be positioned in close proximity to the faces 27 of the cover belt 13, as illustrated in the broken away disclosure of the belt 13 in Figure 1. With reference to Figure 4 it will be seen that the trough in the cover belt 13 is of the same width as the trough in the carrier belt 9, and therefore the same as the distance between the vertical flanges of the channels 21, so that there is no escape of material between the belts as they come together.

The carrier belt 9 travels towards the feeding apparatus in the direction indicated by the arrow in Figure 1 and in contact with the belt 13. Upon reaching the apparatus it passes from out of contact with the belt 13 and through a passageway 28 enclosed within the material feeding chute or hopper 29 which feeds material into the belt loading hopper 5. The belt 9 upon passing from the end of the passageway 28 passes around a pulley 30 and thence on to the slides 14 and underneath the hopper 5. The belt 9 in passing around the pulley 30 has its trough directed towards the pulley and as such belt 9 is provided with a plurality of circular partitions 31, the pulley 30 is formed with a peripheral groove 32 to receive the partitions.

As the material carrying portion of the belt 9 travelling between the end of the hopper and the cover belt 3, after the belt has passed through the hopper, is not covered by the cover belt, I provide a semi-cylindrical metal cover 33 which extends between the end of the hopper and the curved belt 13. The forward end 34 of such member 33 has a curvature corresponding to the curvature of the outer faces of the cover belt 13 so that it is in close contact therewith to prevent the possibility of fine material fluffing out. The forward and rear ends of the hopper are provided with semi-circular orifices 35 and 36 through which the belt 9 and its partitions 31 pass. The member 33 is of substantially the same internal diameter as the diameter of the partitions 31, so that the partitions and the material heaped therebetween can freely pass through such member 33. The member 33 is secured upon a vertical plate 37 which is supported on the front face of the end of the hopper by a pair of bolts 38 which pass through vertical slots 39 in the plate 37 and are threaded into orifices 40 in the forward end of the hopper. By loosening the bolts 38 the plate 37 and member 33 can be adjusted in height to regulate the heaping of the material in the belt 9 as it passes from out of the hopper.

The portion of the belt 9 between the pulley 30 and the rear end of the hopper is also covered by a member 41 of similar shape to the member 33, and the pulley 30 is arranged at such a distance from the end of the hopper, and the member 41 of such a length, that as one partition 31 enters the hopper, another partition has entered the member 41, as shown by two of the partitions illustrated in dotted lines in Figure 1. By this construction there is no possibility of powdery material creeping back towards the pulley 30 through the member 41. The member 33 is also of such a length that as one partition 31 passes from its outer end another partition 31 has entered its inner end. The pulleys 22 and 30 are suitably supported and are, of course, substantially in alignment with the hopper assembly.

When a conveyer incorporating my feeding apparatus is being installed, the belt 13 is carried around the pulley 22, and the belt 9 carried through the passageway 28 and around the pulley 30, thence passing underneath the hopper and back into engagement with the belt 13. The portion of the belt 9 underneath the hopper and between the pulleys 22 and 30, rests upon the slides 14. The slide supporting assembly, consisting of the angle irons 16 and stud bolts 18 is then adjusted as to height until the belt 9 passes into proper interlocking engagement with the belt 13 underneath the pulley 22.

The hopper 5 which carries the guide angle irons 21 is then adjusted in height and position by adjustment of the stud bolts 7 until the bottom edges of the vertical flanges of the angle irons are in close proximity to the upper faces of the belt 9. The bolts 25 which secure the angle irons 21 to the bottom of the hopper are then loosened and the angle members slid until their rounded ends 26 are in close relation to the curved outer faces of the belt 13 passing around the pulley 12. After the foregoing several adjustments have been made to obtain proper functioning of the mechanism, the various nuts are tightened up.

As the semi-circular orifice 35 in the forward end of the hopper is slightly larger than the upper portions of the partitions 31 which pass through such orifice, the metal belt cover 33 is then adjusted in height with regard to the particular type of material to be conveyed. In the case of free-flowing granular material, the member 33 can be adjusted so that its inner face is in close proximity to the edges of the partitions travelling therethrough, but in the case of lumpy material, it may be found desirable to raise the member 33 to obtain a greater clearance between the inner face of such member and the tops of the partitions. In regard to the member 41 which covers the belt 9 at the rear end of the hopper, this member is only provided to prevent the material in the hopper from possibly puffing out through the orifice 36 against the movement of the belt, and therefore this member 41 is permanently set with just sufficient clearance to permit the partitions passing freely therethrough.

From the foregoing description it will be apparent that I have devised a very suitable feeding apparatus for my tubular belt conveyer, and although I have shown a particular embodiment of my invention, it is to be understood that I can make such changes and alterations as I may at any time deem necessary without departing from the spirit of my invention as set forth in the appended claims.

What I claim as my invention is:

1. In a feeding apparatus of the character described, a material feeding hopper having an opening in the bottom thereof, a trough shaped material receiving belt travelling underneath the bottom of the hopper, a cover belt adapted to travel with and cover the material receiving belt after the material receiving belt passes from underneath the hopper, a pulley positioned with its axis above the material receiving belt and around which the cover belt passes to engage the material carrying belt, and a pair of guide members adjustably mounted underneath the bottom of the hopper in close relationship to the material carrying belt at either side of the trough therein, the guide members projecting beyond the end of the hopper and having their ends in close proximity to the cover belt at the point where it is just moving into contact with the material carrying belt.

2. In a feeding apparatus of the character described, a material feeding hopper having an opening in the bottom thereof, a trough shaped material receiving belt travelling underneath the bottom of the hopper, a cover belt adapted to travel with and cover the material receiving belt after the material receiving belt passes from underneath the hopper, a pulley positioned with its axis above the material receiving belt and around which the cover belt passes to engage the material carrying belt, and a pair of guide members adjustably mounted underneath the bottom of the hopper in close relationship to the material carrying belt at either side of the trough therein, the guide members projecting beyond the end of the hopper and having their end edges curved with the same curvature as that of the cover belt passing around the pulley and said edges in close proximity to the cover belt at the point where it is just moving into contact with the material carrying belt.

3. In a feeding apparatus of the character described, a pair of hopper supporting members, a material feeding hopper mounted between such members and adjustably supported thereby, a trough shaped material receiving belt travelling between such members and underneath an opening in the bottom of the hopper, an element upon which the belt is slidably supported underneath the hopper, and means for adjusting said element and belt in height relationship to the bottom of the hopper.

4. In a feeding apparatus of the character described, a pair of hopper supporting members, a material feeding hopper mounted between such members and adjustably supported thereby, a trough shaped material receiving belt travelling between such members and underneath an opening in the bottom of the hopper, a block extending the length of the hopper and upon which the belt is slidably supported underneath the hopper, and means for adjusting said block and belt in height relationship to the bottom of the hopper.

5. In a feeding apparatus of the character described, a pair of hopper supporting members, a material feeding hopper mounted between such members and adjustably supported thereby, a trough shaped material receiving belt travelling between such members and underneath an opening in the bottom of the hopper, a block extending the length of the hopper upon which the belt is slidably supported underneath the hopper, means for adjusting said block and belt in height relationship to the bottom of the hopper, a cover belt adapted to travel with and cover the material receiving belt after the material receiving belt passes from underneath the hopper, a pulley positioned with its axis above the material receiving belt and around which the cover belt passes to engage the material carrying belt, and a pair of guide members adjustably mounted underneath the bottom of the hopper in close relationship to the material carrying belt at either side of the trough therein, the guide members projecting beyond the end of the hopper and having their ends in close proximity to the cover belt at the point where it is just moving into contact with the material carrying belt.

6. In a feeding apparatus of the character described, a pair of hopper supporting members, a material feeding hopper mounted between such members and adjustably supported thereby, a trough shaped material receiving belt travelling between such members and underneath an opening in the bottom of the hopper, a block extending the length of the hopper and upon which the material receiving belt is slidably supported underneath the hopper, a cover belt adapted to travel with and cover the material receiving belt after the material receiving belt passes from underneath the hopper, a pulley positioned with its axis above the material receiving belt and around which the cover belt passes to engage the material receiving belt, and a pair of guide members adjustably mounted underneath the bottom of the hopper in close relationship to the material carrying belt at either side of the trough therein, the guide members projecting beyond the end of the hopper and having their ends in close proximity to the cover belt at the point where it is just moving into contact with the material carrying belt.

7. In a feeding apparatus of the character described, a pair of hopper supporting members, a material feeding hopper mounted between such members and adjustably supported thereby, a trough shaped material receiving belt travelling between such members and underneath an opening in the bottom of the hopper, a pair of guide members extending downwardly from the hopper at either side of the bottom opening therein and having their lower edges in close relationship to the belt at either side of the trough therein, a cover belt adapted to travel with and cover the material receiving belt after the material receiving belt passes from underneath the hopper, a pulley positioned with its axis above the material receiving belt and around which the cover belt passes to engage the material receiving belt, a block extending the length of the hopper and also to a point substantially underneath the axis of the pulley and upon which the belt is slidably supported underneath the hopper and in its travel from the hopper to the point of contact with the cover belt, and means for adjusting said block and material receiving belt in height relationship to the bottom of the hopper.

8. In a feeding apparatus of the character described, a pair of hopper supporting members, a material feeding hopper mounted between such members and adjustably supported thereby, a trough shaped material receiving belt travelling between such members and underneath an opening in the bottom of the hopper, a block extending the length of the hopper and upon which the material receiving belt is slidably supported underneath the hopper, a cover belt adapted to travel with and cover the material receiving belt after the material receiving belt passes from underneath the hopper, a pulley positioned with its axis above the material receiving belt and around which the cover belt passes to engage the material receiving belt, a pair of guide members adjustably mounted underneath the bottom of the hopper in close relationship to the material carrying belt at either side of the trough therein, the guide members projecting beyond the end of the hopper and having their ends in close proximity to the cover belt at the point where it is just moving into contact with the material carrying belt, a cover member of arch shaped cross-section for covering the portion of the material receiving belt between the hopper and the portion of the cover belt passing around the pulley to contact the material receiving belt, and means for adjusting said arch shaped member in height relationship to the material receiving belt.

9. In a feeding apparatus of the character described, a pair of hopper supporting members, a material feeding hopper mounted between such members and adjustably supported thereby, a trough shaped material receiving belt travelling between such members and underneath an opening in the bottom of the hopper, a block extending the length of the hopper and upon which the material receiving belt is slidably supported underneath the hopper, a cover belt adapted to travel with and cover the material receiving belt after the material receiving belt passes from underneath the hopper, a pulley positioned with its axis above the material receiving belt and around which the cover belt passes to engage the material receiving belt, a pair of guide members adjustably mounted underneath the bottom of the hopper in close relationship to the material carrying belt at either side of the trough therein, the guide members projecting beyond the end of the hopper and having their ends in close proximity to the cover belt at the point where it is just moving into contact with the material carrying belt, a cover member of arch shaped cross section for covering the portion of the material receiving belt between the hopper and the portion of the cover belt passing around the pulley to contact the material receiving belt, the end edge of the arch shaped member being curved with the same curvature as that of the cover belt passing around the pulley and said edge in close proximity to the cover belt at the point where it is just moving into contact with the material carrying belt, and means for adjusting said arch shaped member in height relationship to the material receiving belt.

10. In a feeding apparatus of the character described, a pair of hopper supporting members, a material feeding hopper mounted between such members and adjustably supported thereby, a trough shaped material receiving belt travelling between such members and underneath an opening in the bottom of the hopper, a pair of guide members extending downwardly from the hopper at either side of the bottom opening therein and having their lower edges in close relationship to the belt at either side of the trough therein, a cover belt adapted to travel with and cover the material receiving belt after the material receiving belt passes from underneath the hopper, a pulley positioned with its axis above the material receiving belt and around which the cover belt passes to engage the material receiving belt, a block extending the length of the hopper and also to a point substantially underneath the axis of the pulley and upon which the belt is slidably supported underneath the hopper and in its travel from the hopper to the point of contact with the cover belt, means for adjusting said block and material receiving belt in height relationship to the bottom of the hopper, a cover member of arch shaped cross-section for covering the portion of the material receiving belt between the hopper and the portion of the cover belt passing around the pulley to contact the material receiving belt, and means for adjusting said arch shaped member in height relationship to the material receiving belt.

11. In a feeding apparatus of the character described, a pair of hopper supporting members, a material feeding hopper mounted between such members and adjustably supported thereby, a trough shaped material receiving belt travelling between such members and underneath an opening in the bottom of the hopper, a pair of guide members extending downwardly from the hopper at either side of the bottom opening therein and having their lower edges in close relationship to the belt at either side of the trough therein, a cover belt adapted to travel with and cover the material receiving belt after the material receiving belt passes from underneath the hopper, a pulley positioned with its axis above the material receiving belt and around which the cover belt passes to engage the material receiving belt, a block extending the length of the hopper and also to a point substantially underneath the axis of the pulley and upon which the belt is slidably supported underneath the hopper and in its travel from the hopper to the point of contact with the cover belt, means for adjusting said block and material receiving belt in height relationship to the bottom of the hopper, a cover member of arch shaped cross-section for covering the portion of the material receiving belt between the hopper and the portion of the cover belt passing around the pulley to contact the material receiving belt, the end edge of the arch shaped member being curved with the same curvature as that of the cover belt passing around the pulley and said edge in close proximity to the cover belt at the point where it is just moving into contact with the material carrying belt, and means for adjusting said arch shaped member in height relationship to the material receiving belt.

12. In a feeding apparatus of the character described, a pair of hopper supporting members, a material feeding hopper mounted between such members and adjustably supported thereby, a trough shaped material receiving belt travelling between such members and underneath an opening in the bottom of the hopper, a block extending the length of the hopper and upon which the material receiving belt is slidably supported underneath the hopper, a cover belt adapted to travel with and cover the material receiving belt after the material receiving belt passes from underneath the hopper, a pulley positioned with its axis above the material receiving belt and around which the cover belt passes to engage the material receiving belt, a pair of guide members adjustably mounted underneath the bottom of the hopper in close relationship to the material carrying belt at either side of the trough therein, a second pulley positioned at the opposite end of the hopper to the first pulley with its axis in a plane above the bottom of the hopper and around which the material receiving belt is carried to pass underneath the hopper, and a pair of arch shaped members covering the material receiving belt and extending from the ends of the hopper into substantially close proximity with the pulleys, and means for adjusting said arch shaped members in height relationship to the material receiving belt.

HENRY STINSON JOHNS.